UNITED STATES PATENT OFFICE.

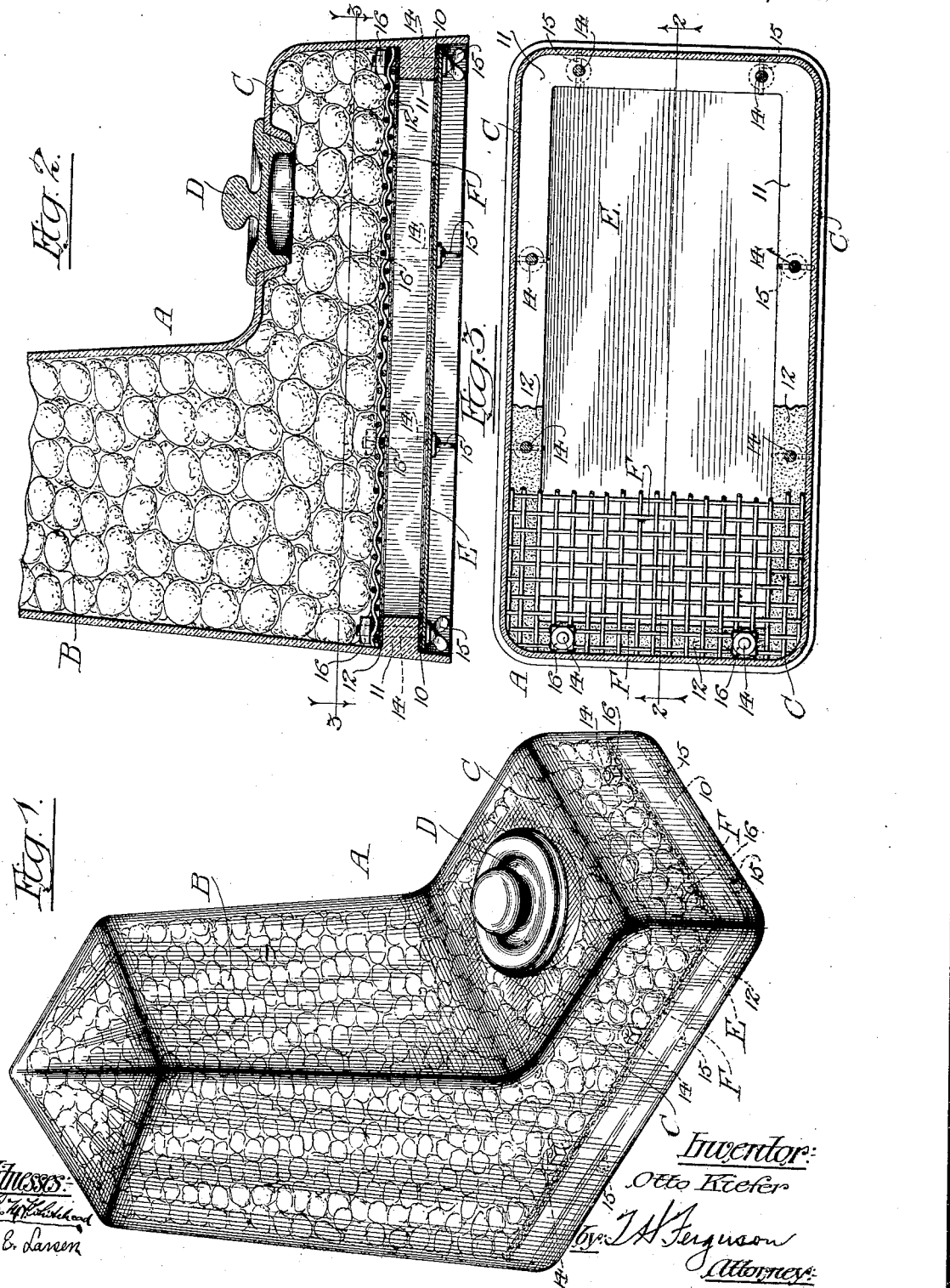

OTTO KIEFER, OF CHICAGO, ILLINOIS.

JAR.

1,131,844.  Specification of Letters Patent.  Patented Mar. 16, 1915.

Application filed February 20, 1914. Serial No. 819,880.

*To all whom it may concern:*

Be it known that I, OTTO KIEFER, a citizen of the United States, residing at Chicago, in the county of Cook and State of Illinois, have invented certain new and useful Improvements in Jars, of which the following is a specification.

The present invention relates to jars and more particularly jars for holding small articles in bulk, such as candy when manufactured in small pieces.

My improved jar is useful as a receptacle for various articles, but is especially useful for the storage and dispensing of candy and will be described in that connection.

In storing and handling candy, it is desirable to keep the candy away from the air as much as possible so that it will not take up moisture or impurities from the air. For this purpose it is desirable to make the jar substantially air-tight. It is also desirable in removing the candy from the jar to remove that portion which is nearest to the opening and which alone is touched by the hand or implement employed in removing it. A jar constructed in this way leaves the bulk of the candy untouched and free from possible contamination by the hand or implement. It is also desirable in many instances to have the contents of the jar displayed to possible purchasers. For this purpose the jar should be made transparent. It is further desirable to keep the crumbs and finer particles of the candy from the pieces of commercial size.

The object of my invention is to construct a jar which shall have these desirable features and at the same time be economical to manufacture, and capable of being readily cleaned, filled and emptied. To this end I employ a glass vessel having an upright portion in which the bulk of the candy is located and advantageously displayed. The vessel also contains a horizontal portion which extends forward from the base of the upright portion and has an opening in the upper wall through which the candy may be readily removed. A glass stopper is provided for this opening. The vessel is provided with an opening in its base which is normally closed by a removable bottom. A screen spaced above the bottom serves to separate the crumbs and finer particles of candy from the pieces of commercial size. These various features of my invention will be more readily understood upon reference to the following detailed description taken in connection with the accompanying drawing, and the scope of the invention will be particularly pointed out in the appended claims.

In the drawing, Figure 1 is a perspective view of a jar constructed in accordance with my invention; Fig. 2 is a vertical section of the same taken on a plane indicated by the line 2—2 of Fig. 3; and Fig. 3 is a horizontal section taken on a plane indicated by the line 3—3 of Fig. 2.

Throughout these figures like characters refer to like parts.

Referring to the drawings in detail, A designates the body of the jar which is composed of glass and comprises an upright portion B, in which the candy is located, and a horizontal portion C, which extends forward from the base of the upright portion B and which has an opening in its upper wall. This opening is provided with a stopper D. A removable bottom E, which closes the opening in the underside of the vessel, and a screen F spaced from the bottom, serves to separate the crumbs and finer particles of candy from the pieces of commercial size.

The upright portion B may be given any desired form, such as the form illustrated. This portion is also preferably closed at its top. With this construction, the candy located in this portion is advantageously displayed through the transparent walls of this portion of the vessel. The horizontal portion C has sufficient depth to enable the pieces of candy to more or less fill the space directly beneath the opening in its upper wall, so that the same may be readily removed by the hand or a suitable scoop, or other implement, when the closure D is lifted from the opening. The walls of the opening and the engaging surfaces of the stopper D may be ground so as to provide a substantially air tight joint. The bottom E is composed of sheet-metal or similar material, and is shaped so as to fit within the edges of the lower portion of the glass vessel of the jar. When in position, it rests against the ring or gasket 10, of rubber, and the latter bears against the under face of a flange 11, which is preferably integral with the adjacent walls of the glass vessel. A similar ring or gasket 12 rests on the upper face of the flange 11 and upon this the edges of the screen F rest. Bolts 14 pass through openings in the bottom E, gasket 10, flange 11, gasket 12, and screen F, for the purpose of holding these parts together. These bolts are provided with winged heads 15 at their lower ends and are threaded into nuts 16 at their upper ends. Any suitable number of these bolts may be provided; eight are shown in the illustrated embodiment of the invention. The nuts 16 are preferably soldered to the upper side of the screen F so that they are not free to rotate. As a result of this construction, the bolts 14 may be readily screwed tight in each instance by grasping the head 15 and turning it in the proper direction. When all the bolts are screwed home, a substantially air-tight closure is provided.

From the description thus far, it will be seen that when the jar is filled with candy, the stopper D may be withdrawn at will from the opening in the upper wall of the extension C. As the candy is removed from the neighborhood of this opening, more candy works down from the interior of the portion B to fill the place of that removed. Because of the relative position of the portions B and C, the candy is not forced upward against the stopper D. It will also be seen that as the candy works down and particles break off and crumbs are produced, these particles and crumbs will pass through the screen F and be deposited upon the upper side of the removable bottom E. In this way the finer particles which are not so desirable to the purchaser, are separated from the more desirable pieces. The stopper D and the coöperating walls of the opening in which it fits, as previously indicated, preferably have their engaging surfaces ground so as to provide a substantially air-tight closure. Likewise, a substantially air-tight closure is provided by the removable bottom E and the coöperating gasket 10. Thus the candy is kept free from the outside air with its impurities and moisture. When the jar is emptied of its contents and it is desired to refill it, the bolts 14 may be screwed out of the nuts 16 and withdrawn. The bottom E and the gasket 10 may then be removed and the deposit upon the upper surface of the bottom E cleaned off. The screen F may also be removed from the interior of the jar by slightly moving one end upward and then turning it diagonally of the opening through the bottom and withdrawing it. It may be replaced by a reverse operation. When the bottom E and the screen F are removed, the interior of the jar may be readily cleaned and filled with a fresh supply of candy.

The jar may be filled with candy in different ways. Where it is desired to only partially fill the jar, it may be filled through the bottom before the screen F and bottom E are placed in position. Because of the necessity of holding the screen F in a diagonal position while passing it through the opening in the under side of the jar, it is not possible to completely fill the jar through said opening before putting the screen in place. However, after the jar has been thus partially filled and the screen F and bottom E have been replaced, the balance of the jar may be filled by tilting the jar on its lefthand side, as viewed in Fig. 2, or into a suitable position, and passing the rest of the candy through the opening normally closed by the stopper D. In other instances it may be desired to entirely or partially fill the jar by passing all of the candy through this opening in the upper wall of the extension C. In such case the screen F and bottom E are put in place while the jar is empty, and then the jar is tilted into a suitable position and the candy is passed through the opening as before. When filled and resting upon its base, the candy may be removed as before explained.

It will be apparent that in carrying out my invention the general shape of the jar, the means for securing the removable bottom E and the screen F in place, and other details may be varied without departing from the spirit of my invention.

It will also be apparent that my improved jar may be used for storing and dispensing other manufactures than candy, although, as previously noted, it is especially designed for this purpose and for use with other manufactures having characteristics similar to those of candy. Therefore, I do not wish to be limited to the specific details herein disclosed, but aim to cover the various applications of my invention, and the various modifications of its construction, by the terms of the appended claims.

What I claim as new and desire to secure by Letters Patent of the United States is:

1. A jar for candy and the like comprising a vessel having an upright portion permanently closed at its upper end and a horizontal portion extending forward from the base of said upright portion and having an opening in its upper wall, a closure for said opening, a removable bottom for said vessel extending beneath both said upright and horizontal portions, and a screen of substantially the same extent as said bottom and spaced above the same to allow the crumbs and finer particles of candy to fall upon said bottom.

2. A substantially air tight jar for candy and the like comprising a vessel of transparent material having an upright portion permanently closed at its upper end and a horizontal portion extending forward from the base of said upright portion and having an opening in its upper wall, means for providing a substantially air tight closure for said opening, a removable bottom for said vessel extending beneath both said upright and horizontal portions, means for securing said bottom to said vessel with substantially an air tight joint, and a screen of substantially the same extent as said bottom and spaced above the same to allow the crumbs and finer particles of candy to fall upon said bottom.

In witness whereof, I hereunto subscribe my name this 14 day of February, A. D. 1914.

OTTO KIEFER.

Witnesses:
T. H. FERGUSON,
I. E. LARSEN.

Copies of this patent may be obtained for five cents each, by addressing the "Commissioner of Patents, Washington, D. C."